US007739585B2

(12) United States Patent
Li et al.

(10) Patent No.: US 7,739,585 B2
(45) Date of Patent: Jun. 15, 2010

(54) MULTIMEDIA PLAYING APPARATUS AND METHOD

(75) Inventors: Xiao-Guang Li, Guangdong (CN);
Wen-Chuan Lian, Guangdong (CN);
Kuan-Hong Hsieh, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 936 days.

(21) Appl. No.: 11/309,447

(22) Filed: Aug. 8, 2006

(65) Prior Publication Data

US 2007/0094406 A1    Apr. 26, 2007

(30) Foreign Application Priority Data

Oct. 13, 2005   (CN) ..................... 2005 1 0100400

(51) Int. Cl.
G06F 17/00     (2006.01)
G06F 17/30     (2006.01)
(52) U.S. Cl. ................... 715/203; 715/201; 715/205
(58) Field of Classification Search .............. 715/203
See application file for complete search history.

(56) References Cited

U.S. PATENT DOCUMENTS

| 6,078,005 | A | * | 6/2000 | Kurakake et al. ......... 84/477 R |
| 6,745,368 | B1 | * | 6/2004 | Boucher et al. ............ 715/205 |
| 6,944,629 | B1 | * | 9/2005 | Shioi et al. ................ 707/104.1 |
| 7,281,199 | B1 | * | 10/2007 | Nicol et al. ................. 715/203 |
| 2001/0042107 | A1 | * | 11/2001 | Palm .......................... 709/218 |
| 2002/0189427 | A1 | * | 12/2002 | Pachet ......................... 84/609 |
| 2003/0124502 | A1 | * | 7/2003 | Chou .......................... 434/350 |
| 2004/0230887 | A1 | * | 11/2004 | Sellen et al. ............. 715/500.1 |
| 2005/0146621 | A1 | * | 7/2005 | Tanaka et al. ............. 348/211.2 |
| 2005/0147385 | A1 | * | 7/2005 | Takahashi et al. ............ 386/69 |
| 2005/0165849 | A1 | * | 7/2005 | Moradi et al. ............ 707/104.1 |
| 2005/0234983 | A1 | * | 10/2005 | Plastina et al. ........... 707/104.1 |
| 2006/0236342 | A1 | * | 10/2006 | Kunkel et al. ................. 725/52 |

FOREIGN PATENT DOCUMENTS

| CN | 1622609 A | 6/2005 |
| TW | I239194 | 9/2005 |
| WO | WO2004049199 A2 | 6/2004 |

* cited by examiner

*Primary Examiner*—Doug Hutton
*Assistant Examiner*—Zaida I Marrero
(74) *Attorney, Agent, or Firm*—Winston Hsu

(57) ABSTRACT

A multimedia playing apparatus is provided. The multimedia playing apparatus includes a memory for storing image files and multi media hyper link (MMHL) files, each MMHL file comprising timeline information, audio information, and text information; and a central processing unit (CPU) electrically connected to the memory for reading an image file from the memory, obtaining an MMHL file matched with the image file based on a name of the image file, and controlling simultaneous output of the image file and the MMHL file according to the timeline information. A multimedia playing method is also provided.

4 Claims, 4 Drawing Sheets

MULTIMEDIA PLAYING APPARATUS AND METHOD

TECHNICAL FIELD

The present invention relates to playing apparatuses and methods, and particularly to a multimedia playing apparatus and method.

GENERAL BACKGROUND

In recent years a combination of an increase in printed materials such as books and magazines and a use of computers has led to a large production of computer printouts. The explosion of this production of information and paper has created problems for libraries that do not have sufficient storage space for these materials, furthermore, the books are often so large in size and heavy that a reader may find it inconvenient to handle the books. In addition, books are becoming increasingly expensive.

Therefore, it was desirable to have a digital reader in the form of an electronic book that presents the reader with a reading experience that approximates that of reading a printed book. Whereafter, the electronic book has been developed. The electronic book not only can store a lot of information, but is also portable. However, a conventional electronic book only displays text information, eyes of the user grows tired if read for a long time, decreasing reading interest of the user. Furthermore, if the user's eyesight is not very good, the electronic book is difficult to read it.

To solve such problems, some special electronic books have been developed. For example, one kind of electronic books displays images or texts thereof, and simultaneously plays background music. Image files or text files of the electronic book are generally associated with the audio files by below-described manners. These files include a same tag, or are encapsulated and compressed into a new file. However, these files cannot be played via normal playing programs. Furthermore, these manners cannot associate multimedia files in different format, and size of these files is so large that they are not easily stored.

Thus, an improved multimedia playing apparatus which can overcome the above-mentioned problems is desired.

SUMMARY

A multimedia playing apparatus is provided. The multimedia playing apparatus includes a memory for storing image files, picture files, and multi media hyper link (MMHL) files, each MMHL file comprising timeline information, audio information, and text information; and a central processing unit (CPU) electrically connected to the memory for reading an image file from the memory, obtaining an MMHL file matched with the image file based on a name of the image file, and controlling simultaneous output of the image file and the MMHL file according to the timeline information.

A multimedia playing method is also provided. The method includes the steps of: (a) providing a memory for storing image files and multi media hyper link (MMHL) files matched with the image files; (b) reading an image file; (c) obtaining MMHL file information matched with the image file based on a name of the image file, the MMHL file information comprising timeline information, audio information, and text information; and (d) outputting digital images, digital audios, and digital texts of the MMHL file.

Other advantages and novel features will become more apparent from the following detailed description when taken in conjunction with the accompanying drawings, in which:

DETAILED DESCRIPTION OF THE PREFERRED EMBODIMENT

Figure 1:
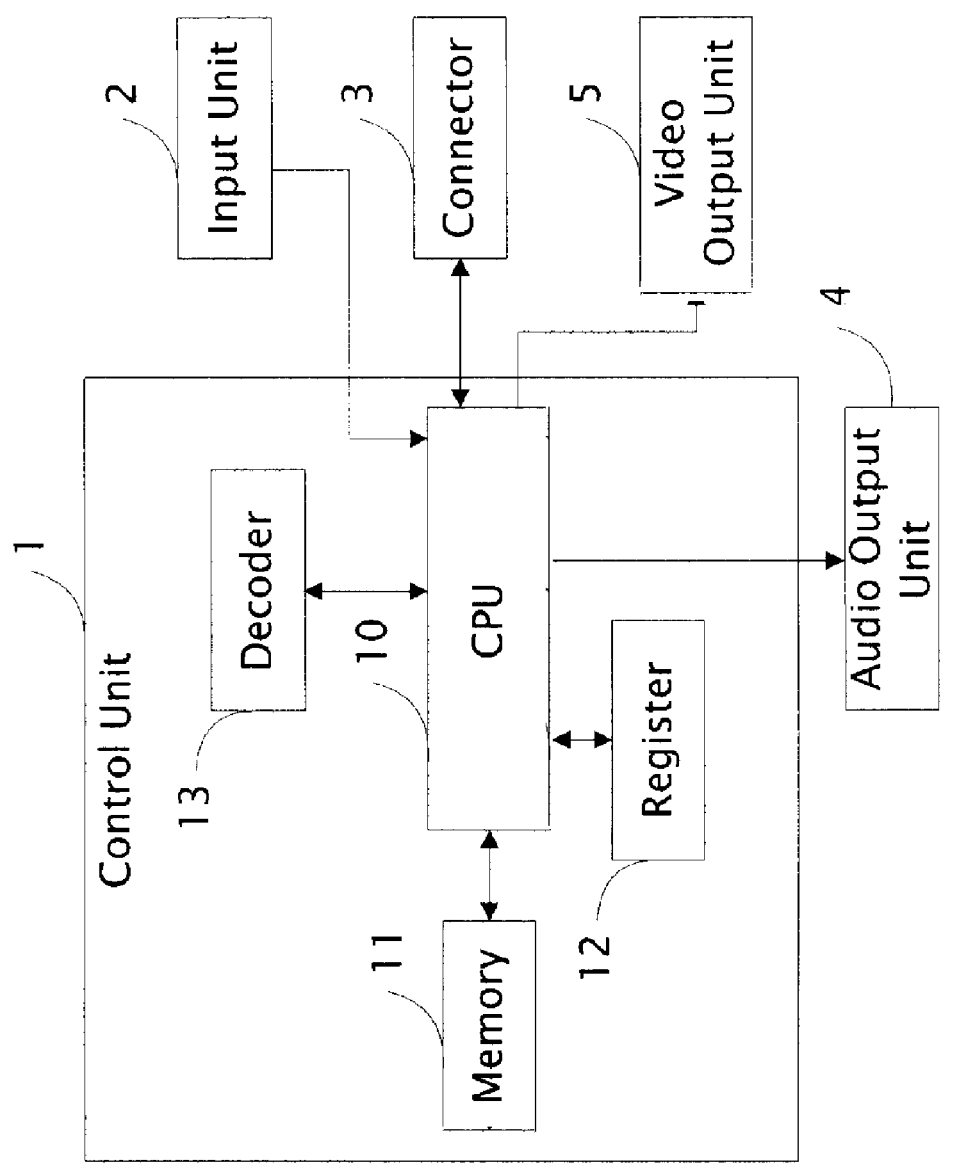
FIG. 1 is a schematic diagram of hardware infrastructure of a multimedia playing apparatus in accordance with a preferred embodiment of the present invention.

Referring now to the drawings, FIG. 1 is a schematic diagram of hardware infrastructure of a multimedia playing apparatus (hereafter, "the apparatus") in accordance with a preferred embodiment of the present invention. The apparatus is used for simultaneously playing an image file and a corresponding multimedia file or a corresponding multi media hyper link (MMHL) file. The apparatus includes a control unit 1, an input unit 2, a connector 3, an audio output unit 4, and a video output unit 5.

The control unit 1 is provided for controlling simultaneously outputting image files and corresponding multimedia files or MMHL files. The control unit 1 includes a central processing unit (CPU) 10, a memory 11, a register 12, and a decompressing unit (decoder) 13.

The CPU 10 is connected with the memory 11, the register 12, and the decompressing unit 13. The CPU 10 searches a multimedia file or an MMHL file corresponding to an image file, and controls simultaneous outputs of the image file and the corresponding multimedia file or MMHL file.

The memory 11 stores a plurality of image files, multimedia files and MMHL files. The image files, multimedia files, and MMHL files may be either in an uncompressed format or in a compressed format. With respect to the compressed format, the image files may be in a Motion Picture Experts Group (MPG/MPEG) format, a movie digital video (MOV) format, an audio video interleave (AVI) format, and any other suitable formats. The multimedia files may be in a word document (DOC) format, a text (TXT) format, a rich text format (RTF) file, an MPEG audio layer 3 (MP3) format, an advanced audio coding (AAC) format. The MMHL files may be in an extensible markup language (XML) format. Further, the multimedia files includes various contents, such as audios, texts, and so on. The MMHL files include various contents that match with the image files, such as timeline information, audios, texts, and so on. These contents are organized in the XML format.

In the preferred embodiment, each image file has a designated name format. That is, the name of each image file includes 6 parts: a file name of the image file, a first designated symbol, a file name of a multimedia file or an MMHL file corresponding to the image file, and a second symbol, and an extension of the corresponding multimedia file or MMHL file, and an extension of the image file. The first and second designated symbols may each be a character that can be recognized by the CPU 10. For example, the first and second designated symbols may both be a question mark "?." Thus, when an image file with the name, for example, "XXX-?YYY?XML.MPG," is to be played, the CPU 10 extracts the file name and the extension of the MMHL file, namely "YYY.XML," from the name of the image file, and then searches for the MMHL files from the memory 11.

The register 12 stores image files which have been read out, including respective multimedia files or MMHL files corresponding to the image files.

The decompressing unit 13 is operable for decompressing the image files, and the corresponding multimedia files or MMHL files, in the register 12.

The input unit 2 is programmed to receive a user operation selecting an image file to be played. The connector 3 is used for connecting the control unit 1 to an electronic device (not shown), in order to download image files, multimedia files, and MMHL files from the electronic device. The video output unit 5 is used for playing image information and digital text information of the multimedia files or the MMHL files. The audio output unit 4 is provided for playing digital sounds of the multimedia file or the MMHL files corresponding to the image files.

Figure 2:
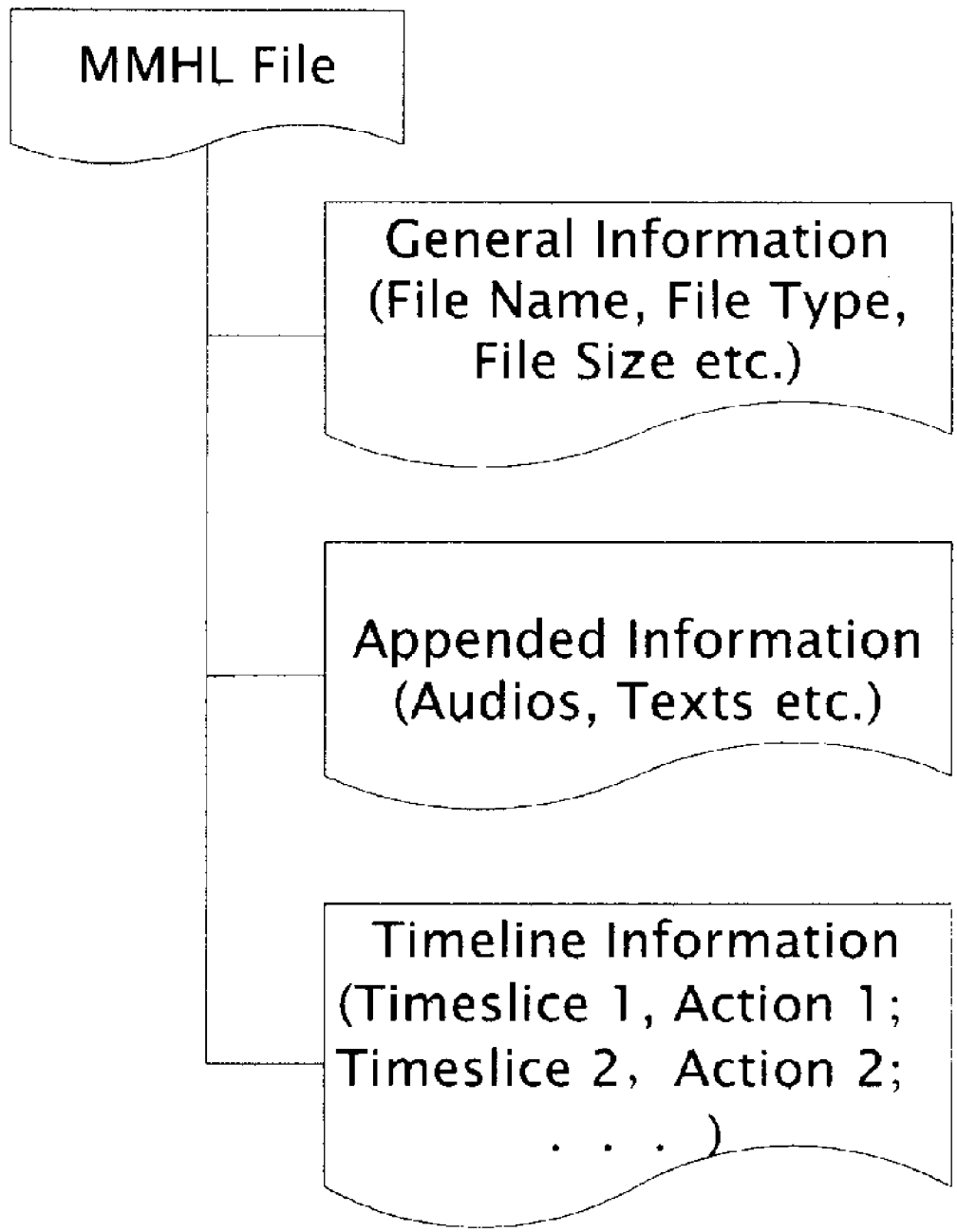
FIG. 2 is a tree diagram illustrating information of an MMHL file stored in a memory of the apparatus of FIG. 1.

FIG. 2 is a tree diagram illustrating information of an MMHL file. The information of the MMHL file includes general information, appended information, and timeline information. The general information includes a name, a type, and a size of the image file. The appended information includes various related contents corresponding to the image file, such as texts, audios, and so on. The time information includes a plurality time slices and related action thereof.

Figure 3:
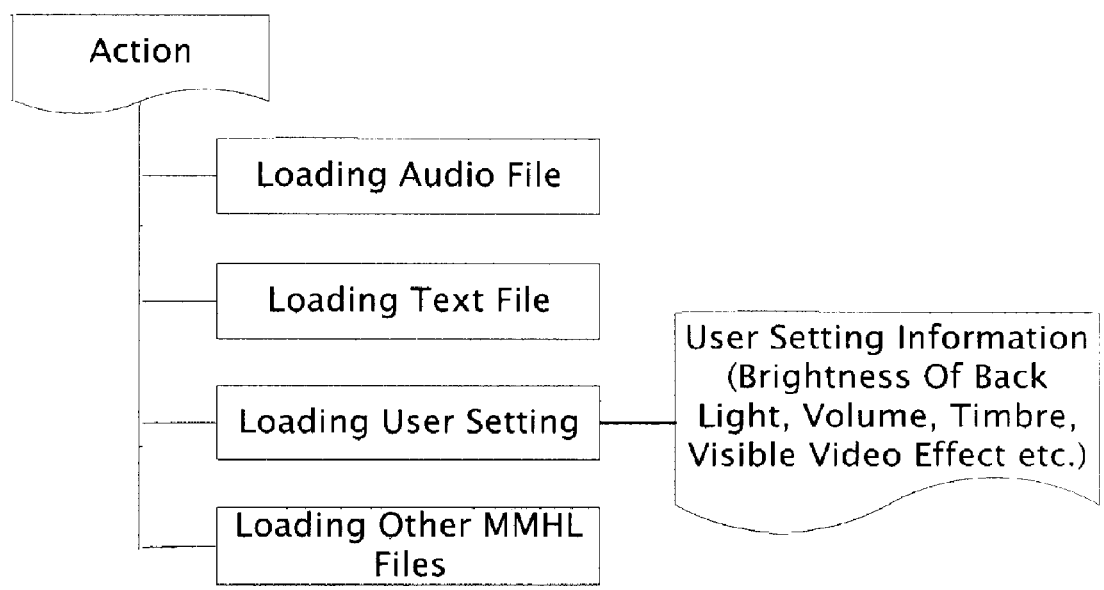
FIG. 3 is a tree diagram illustrating related actions of a time slice of the information shown in FIG. 2.

FIG. 3 is a tree diagram illustrating related actions of a time slice in the MMHL file. The related actions include loading a text file, loading an audio file, loading a user setting, and loading other MMHL files. The user setting includes a brightness of backlight, a volume, a timbre, a visible video effect, etc. The action of loading other MMHL files means inserting another image file and a corresponding MMHL file thereof before a selected image file.

Figure 4:
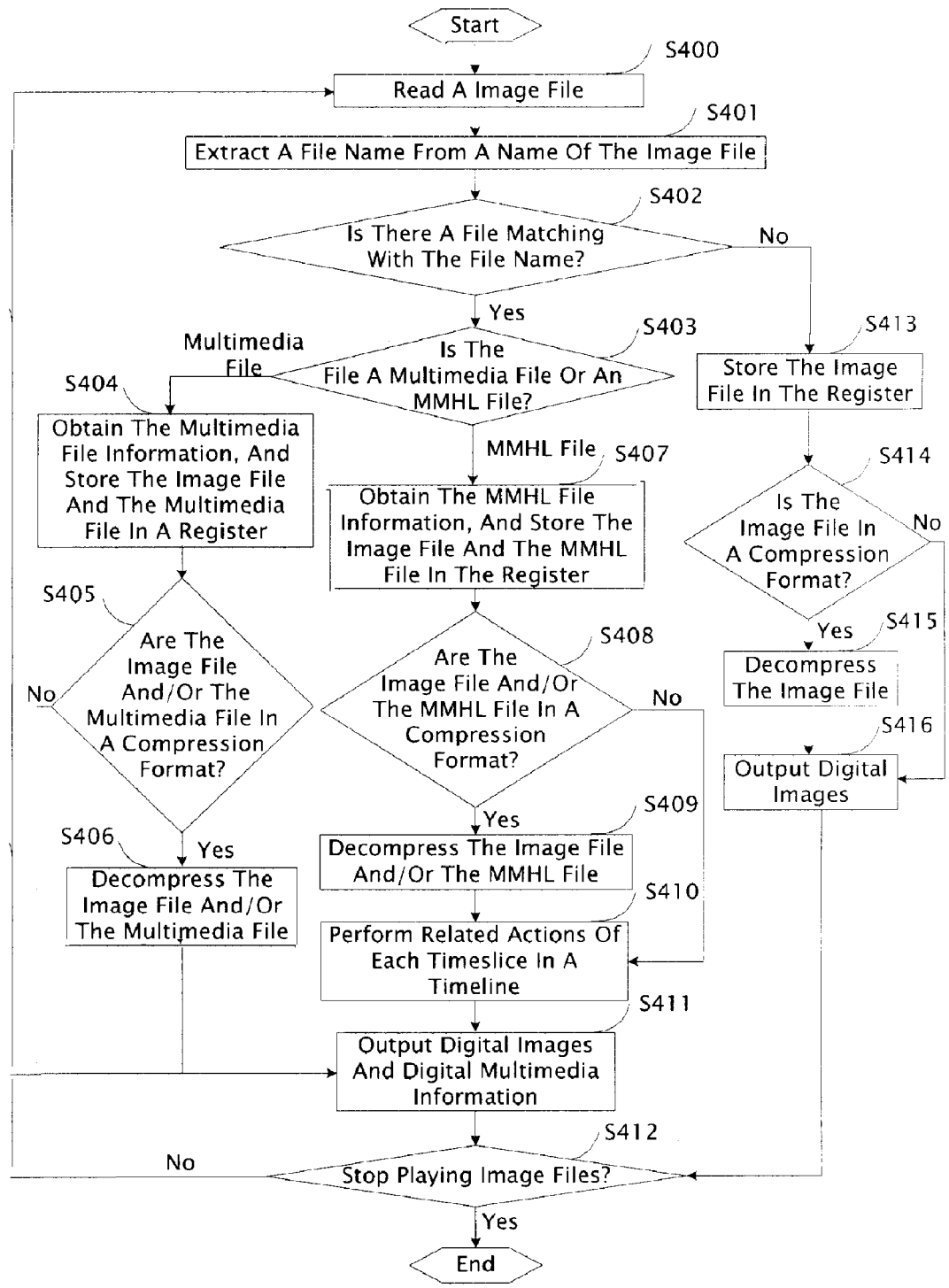
FIG. 4 is a flowchart of a preferred method for implementing the apparatus of FIG. 1.

FIG. 4 is a flowchart of a preferred method by implementing the system of FIG. 1. In step S400, the CPU 10 reads an image file from the memory 11. In step S401, the CPU 10 extracts a file name from a name of the image file. In step S402, the CPU 10 searches the memory 11 for a file that matches with the file name. If there is no matching file in the memory 11, the procedure goes to step S413 described below. If there is a matching file in the memory 11, in step S403, the CPU 10 determines whether the file is the multimedia file or an MMHL file. If the file is an MMHL file, the procedure goes to step S407 described below. If the file is a multimedia file, in step S404, the CPU 10 obtains information of the multimedia file from the memory 11, and stores the image files and the multimedia file in the register 12. Then in step S405, the CPU 10 determines whether the image file and/or the multimedia file are/is in a compressed format. If the image file and/or the multimedia file are/is in a compressed format, in step S406, the decompressing unit 13 decompressed the image file and/or the multimedia file, whereupon the procedure goes to step S411 described below. Otherwise, if neither the image file nor the multimedia file is in a compressed format, the procedure goes directly to step S411 described below.

In step S407, the CPU 10 obtains information of the MMHL file, and stores the image file and the MMHL file in the register 12. Then in step S408, the CPU 10 determines whether the image file and/or the MMHL file are/is in a compressed format. If neither the image file nor the MMHL file is in a compressed format, the procedure goes directly to step S410 described below. Otherwise, if the image file and/or the MMHL file are/is in a compressed format, in step S409, the decompressing unit 13 decompresses the image file and/or the MMHL file, whereupon the procedure goes to step S410. In step S410, the CPU 10 performs related actions of each time slice in the timeline. In step S411, the audio output unit 4 outputs digital audio information of the MMHL file according to the timeline information. At the same time, the video output unit 5 outputs digital images and text information of the MMHL file according to the timeline information. The procedure then goes to step S412 described below.

In step S413, the CPU 10 stores the image file in the register 12. Then in step S414, the CPU 10 determines whether the image file is in a compressed format. If the image file is not in a compressed format, the procedure goes directly to step S416 described below. Otherwise, if the image file is in a compressed format, in step S415, the decompressing unit 13 decompresses the image file, whereupon the procedure goes to step S416. In step S416, the video output unit 5 outputs the digital images, whereupon the procedure goes to step S412.

In step S412, the CPU 10 determines whether to stop playing image files. If the CPU 10 determines to continue playing image files, the procedure returns to step S400 described above. In contrast, if the CPU 10 determines to stop playing image files, the procedure is finished.

Although the present invention had been specifically described on the basis of the preferred embodiment including the preferred method, the invention is not to be construed as being limited thereto. Various changes or modifications may be made to the embodiment including the method without departing from the scope and spirit of the invention.

What is claimed is:

1. A multimedia playing method comprising the steps of:
providing a memory for storing image files and multi media hyper link (MMHL) files matched with the image files, a name of each image file comprising 6 parts: a file name of the image file, a first designated symbol, a file name of an MMHL file corresponding to the image file, a second designated symbol, an extension of the corresponding MMHL file, and an extension of the image file;
reading an image file;
recognizing the first and the second designated symbols and obtaining MMHL file information matched with the image file based on a name of the image file, the MMHL file information comprising timeline information, audio information, and text information; and
outputting digital images of the image file, digital audios corresponding to the audio information, and digital texts corresponding to the text information of the MMHL file according to the timeline information.

2. The multimedia playing method according to claim 1, wherein the first and the second designated symbols each being a character that is recognized.

3. A multimedia playing apparatus comprising:
a memory for storing image files and multi media hyper link (MMHL) files, a name of each image file comprising 6 parts: a file name of the image file, a first designated symbol, a file name of an MMHL file corresponding to the image file, a second designated symbol, an extension of the corresponding MMHL file, and an extension of the image file, each MMHL file comprising timeline information, audio information, and text information; and
a central processing unit (CPU) electrically connected to the memory for reading an image file from the memory, recognizing the first and the second designated symbols and obtaining an MMHL file matched with the image file based on a name of the image file, and controlling simultaneous output of digital images of the image file, digital audios corresponding to the audio information, and digital texts corresponding to the text information of the MMHL file according to the timeline information.

4. The multimedia playing apparatus according to claim 3, wherein the first and the second designated symbols each being a character that can be recognized by the CPU.

* * * * *